United States Patent [19]

Kaplan

[11] 4,043,245
[45] Aug. 23, 1977

[54] ANCHORING DEVICE

[76] Inventor: Stanley Kaplan, Universal Fastenings, 180 Marine St., Farmingdale, N.Y. 11735

[21] Appl. No.: 655,824

[22] Filed: Feb. 6, 1976

[51] Int. Cl.² .............................................. F16B 37/04
[52] U.S. Cl. ..................................... 85/3 R; 151/41.74
[58] Field of Search .............. 85/3 R, 3 K, 3 S, 32 K; 151/41.74; 24/16 PB

[56] References Cited

U.S. PATENT DOCUMENTS

| | | | |
|---|---|---|---|
| 1,035,399 | 8/1912 | Wheeler | 85/3 R |
| 1,556,345 | 10/1925 | Pleister | 85/3 R |
| 1,990,289 | 2/1935 | Krueger | 85/3 R |
| 2,398,220 | 4/1946 | Gelpcke | 85/3 K |
| 2,765,134 | 10/1956 | Hill | 85/3 R X |
| 2,998,743 | 9/1961 | Apfelzweig | 85/3 R |
| 3,211,042 | 10/1965 | Fischer | 85/3 R |
| 3,285,118 | 11/1966 | Elkins | 85/3 R |
| 3,288,014 | 11/1966 | Mortensen | 85/3 R |
| 3,581,347 | 6/1971 | Verspieren | 24/16 PB |
| 3,605,547 | 9/1971 | Millet | 85/3 S |

FOREIGN PATENT DOCUMENTS

| | | | |
|---|---|---|---|
| 149,733 | 7/1952 | Australia | 85/3 S |

*Primary Examiner*—Roy D. Frazier
*Assistant Examiner*—Rodney H. Bonck
*Attorney, Agent, or Firm*—Robert W. Fiddler

[57] ABSTRACT

An anchoring device is disclosed providing engaging means for an attaching member which it is desired to secure with respect to a wall, particularly when there is access to only one surface of the wall. The anchoring device may be formed to provide either secure friction engagement, or threaded engagement with an attaching member, such as a bolt, screw, nail, or friction pin, normally used to fasten an item of hardware or the like to a wall. The anchoring device comprises a toggle plate dimensioned for insertion into a blind opening in the wall to which attaching is desired and an elongate runner is pivotally secured to the toggle plate which may be shaped to form its own hole in the wall member. One or more openings dimensioned to engage the attaching member is formed in the toggle plate. The runner pivotally secured to the toggle plate is of a length such that it may extend from the toggle plate positioned on the blind side of a wall in connection with which the anchoring device is employed through the wall opening and beyond the exposed surface of the wall. A washer of a dimension larger than the opening formed for insertion of the toggle plate is engaged on the runner and drawn against the exposed surface of the wall to retain the toggle plate on the blind side of the wall.

10 Claims, 9 Drawing Figures

U.S. Patent  Aug. 23, 1977  4,043,245
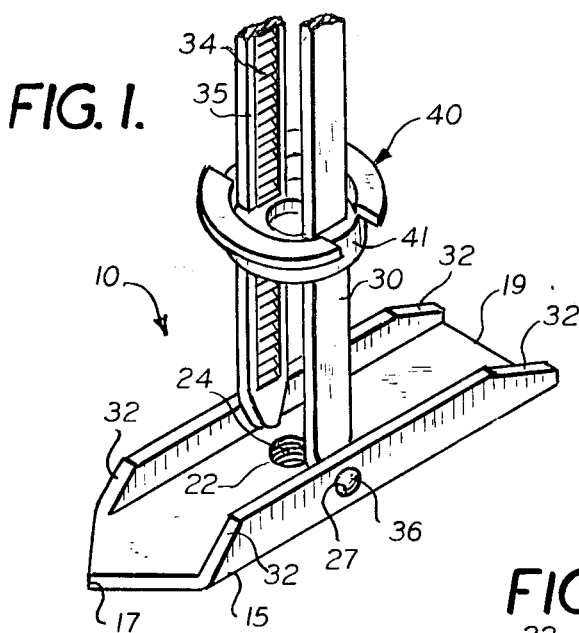
FIG. 1.
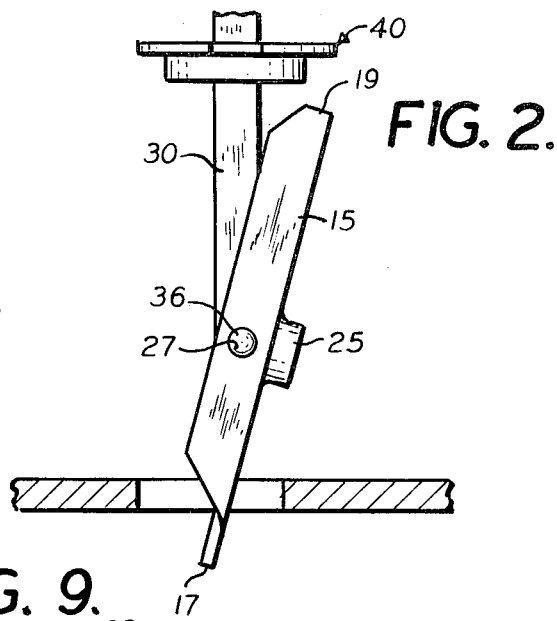
FIG. 2.
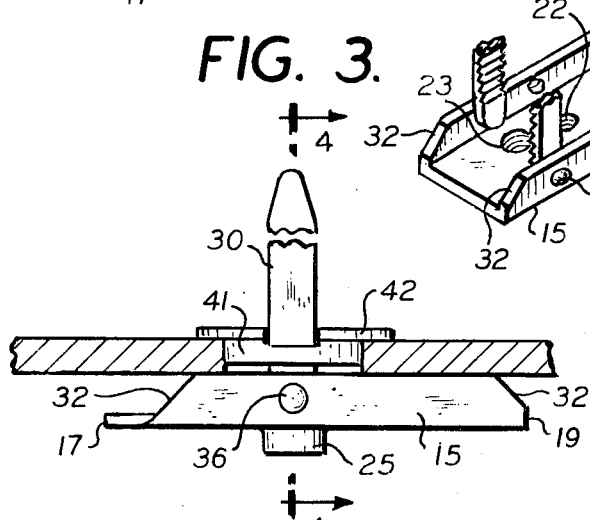
FIG. 3. FIG. 9. FIG. 4.
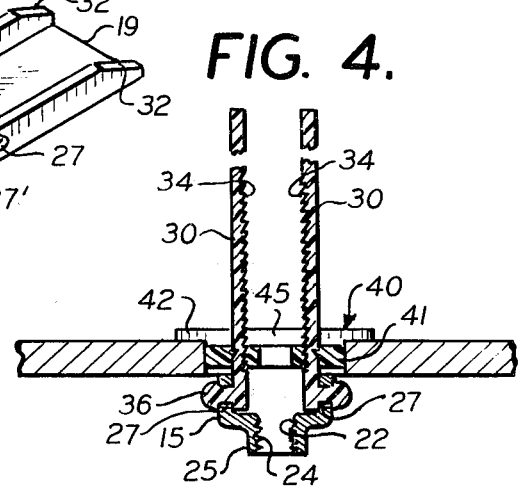
FIG. 5. FIG. 6.
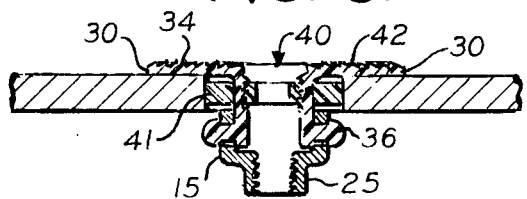
FIG. 7. FIG. 8.
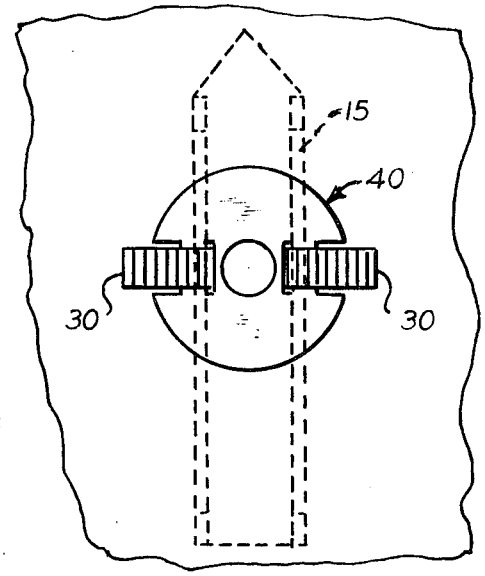

ANCHORING DEVICE

BACKGROUND OF THE INVENTION

This invention relates to anchoring devices, and more particularly to an anchoring device particularly suited for use with walls accessible from only one surface thereof, serving to provide a threaded or friction anchor for an attaching member, such as a bolt, screw, or friction pin, which it is desired to insert into a relatively frangible wall structure which would not normally have the requisite physical characteristics to securely engage and retain the bolt, screw, or friction pin, which is employed to affix some item to the wall.

A variety of situations exist in which it is desired to secure an attaching member, such as a bolt, screw, nail, friction pin, or the like attaching members, to a wall which does not normally have the requisite strength to securely engage the bolt, screw, or friction pin. Thus with plaster walls, or walls formed of plaster board, sheet rock, fiberglass, or the like compositions, and even with many wood panelled walls, it is found that a screw, bolt, or nail will often not be retained securely when driven into the wall to hang mirrors, wall brackets, plaques, and the large variety of different hardware items which it is often desired to secure to a wall.

In the past, a variety of anchor bolts have been evolved for use in fastening an article to a "blind opening" in a wall, that is, an opening which is accessible from only one side of the wall. These anchor bolts have generally been either of a toggle bolt type, or an expansible type. In the toggle bolt type, two spring separated wings are secured to a nut, with the wings adapted for folding parallel to each other along an axis perpendicular to the plane of the nut. A bolt is engaged with the nut, the wings are folded together, and the bolt with the nut and wings is inserted into the blind opening. The wings after passing through the wall expand, and the winged nut is pulled up tight against the blind side of the wall by the bolt, with the bolt and wings remaining on the blind side of the wall. With the expansible anchoring devices, a variety of plug members have been employed which are inserted into the blind opening in the wall, with a screw member engaged in the anchoring device. The plug on the blind side of the wall is then expanded as the screw is threaded into the plug, thus retaining the plug in position on the blind side of the wall.

With these prior devices, when it is desired to replace any items held in place by the bolt and anchoring device, it is found that removal of the bolt or screw permits the anchoring device to drop down on the blind side of the wall, requiring the purchase of a new assembly of screw and anchoring device, and re-positioning of the anchoring device, which often results in undesired enlargement of the hole through which the anchoring device was initially inserted.

Additionally, where it is desired to secure a rather heavy element to a wall, with prior devices, where the attaching member must be engaged with the item to be secured prior to engaging the attaching member to the anchoring device, supporting the item while positioning and securing the anchoring device is rather clumsy.

Another problem with previously evolved anchoring devices is that a specifically dimensioned anchoring device must be used for each differently dimensioned attaching member.

It is with the above considerations in mind that the present improved anchoring device has been evolved providing means whereby a relatively frangible wall structure may be provided with an anchoring device inserted into a blind opening in the wall from an accessible surface of the wall, with the anchoring device retained in position so that an attaching member, such as a bolt, screw, or pressure member may be securely engaged (though selectively removable) with respect to the wall for retaining an article which it is desired to support on the wall, and with a single anchoring device subject to selective use for a number of differently dimensioned attaching members.

It is accordingly among the primary objects of the invention to provide an improved anchoring device adapted for securement through a blind opening in a wall.

An additional object of the invention is to provide an anchoring device which is retained in operative position after securement to a wall and permits any attaching member, such as a bolt, screw, or pressure pin, engaged with the anchoring device to be removed and re-inserted into the anchoring device as desired.

A further object of the invention is to provide an anchoring device which may be selectively employed for anchoring differently dimensioned attaching members.

These and other objects of the invention which will become hereafter apparent are achieved by providing an elongate toggle plate of a width permitting insertion into an opening in a wall member to which attachment is desired. The toggle plate is formed with an opening dimensioned to engage an attaching member, such as a bolt, screw, pressure pin, nail, or the like. The toggle plate may if desired be formed with a plurality of attaching member engaging openings to selectively accommodate different attaching members. Pivotally secured to the toggle plate are one or more elongate runners, preferably in the form of toothed strips. A washer of a dimension larger than the wall opening is formed with a central opening through which the attaching member, such as a bolt, screw, nail, pressure pin, or the like, may pass, and an opening, one for each runner, through which the runner passes. The runner opening is dimensioned to frictionally engage the runner.

In use, the toggle plate is inserted into the wall opening to the blind side thereof, with the runners extending through the opening on the facing or exposed sides of the wall. The washer with the runners threaded through the runner openings in the washer are then pulled along the runners up against the facing side of the wall to bring the toggle plate flush with the blind side of the wall, thus retaining the toggle plate and washer flush against the wall. The runners are then bent over the washer, with the exposed runner end preferably broken off flush with the washer. Thereafter, an attaching member such as a bolt, screw, nail, or pressure pin, is inserted through the washer, through the wall opening, into the toggle plate opening, for anchoring by the toggle plate. As understood, the attaching member will extend through or from the article to be attached to the wall to retain same in position.

A feature of the invention resides in the fact that the attaching member, such as a bolt, screw, nail push pin, or the like, may be removed from the anchoring member, with the anchoring member remaining in position and with the attaching member subject to re-insertion as desired.

Another feature of the invention resides in the fact that the article to be attached to the wall need not be held in position as the anchoring device is positioned.

A further feature resides in the fact that a single anchoring device may be selectively employed to engage and anchor different attaching members.

Another feature of the invention resides in the fact that the toggle plate may be made with a piercing end, permitting the toggle plate to be used to form the wall opening through which the toggle plate is to be inserted.

A further feature of the invention resides in the formation of the washer with runner recesses accommodating the runner flush with the plane of the washer so that the runner may be bent over, and either broken off, or retained in the recess without extending from the plane of the washer, which is substantially flush with the wall.

An additional feature resides in the formation of the runners with ratchet teeth engaging the slide openings in the washer.

BRIEF DESCRIPTION OF THE DRAWINGS

The specific details of a preferred embodiment of the invention, and best mode contemplated for carrying out the invention, and of the manner of making and using it, will be described in full, clear, concise, and exact terms in conjunction with the accompanying drawings, wherein:

FIG. 1 is a perspective view of the anchoring device showing the components thereof ready for use;

FIG. 2 is a schematic elevational view of the anchoring device in FIG. 1 shown as it is being positioned through a wall opening, the wall being shown in cross-section;

FIG. 3 is an elevational view of the device shown in FIG. 1, illustrated in operative position with respect to a wall shown in cross-hatching;

FIG. 4 is a cross-sectional view on lines 4—4 of FIG. 3 on a transverse plane through the anchoring device illustrated in FIG. 3;

FIG. 5 is a cross-sectional view similar to FIG. 4 showing the runners bent down into the washer recesses after the anchoring device is in position;

FIG. 6 is a top plan view on the exposed surface of the wall to which the anchoring device is applied, showing the exposed washer and runners; and the toggle plate in dash lines;

FIG. 7 is a top plan view of the washer forming part of the anchoring device;

FIG. 8 is a plan view of the obverse face of the washer shown in FIG. 7; and

FIG. 9 is a perspective view of a modified form of toggle plate used in forming the anchoring device shown provided with two different attaching member engaging openings.

DESCRIPTION OF PREFERRED EMBODIMENTS

Referring now more particularly to the drawings, where like numerals in the various FIGURES will be employed to designate like parts, the anchoring device 10, as illustratively shown in FIGS. 1 and 2, comprises a toggle plate 15.

The toggle plate 15 as illustratively shown in the FIG. 1-3 embodiment is preferably formed of a channel section and may be made of any of a variety of relatively rigid sheet materials. Preferably toggle plate 15 is formed of sheet steel shaped into the illustrated channel section and provided with a tapered piercing entry end 17 and trailing end 19. An attaching member engaging opening 22 is formed in the base portion of the channel shaped toggle plate at a point preferably closer to the entry end of the toggle plate.

FIGS. 1–3 show the toggle plate formed with a single attaching member engaging opening 22. It is, however, contemplated within the scope of the invention, to provide one or more differently dimensioned additional attaching member engaging openings such as 23 shown in the FIG. 9 embodiment. As illustrated, toggle plate end 19 is preferably further from either openings 22 or 23 than toggle plate end 17. Attaching member engaging openings 22 and 23 are formed of a dimension to accommodate an attaching member such as a bolt, screw, nail, or push pin. As illustrated, in FIGS. 1 and 4, the opening 22 is shown as threaded as at 24 and the toggle plate is formed with a bushing 25, which is preferably stamped out of the sheet material of the toggle plate to increase the area of contact between the toggle plate and the attaching member which it is desired to engage in opening 22. As best seen in FIG. 4, the channel side walls are formed with bearing openings 27, forming a bearing for a pivot connection to runners 30, as hereinafter described. Where additional attaching member openings 23 are provided as shown in FIG. 9, additional bearing openings 27' are provided on diametrically opposed sides of the additional attaching member engaging openings 23.

As illustratively shown in FIG. 9, the toggle plate 15 may if desired be formed with both ends of the channel base perpendicular to the channel axis within the scope of the invention.

As illustrated, the ends of the side walls of toggle plate 15 are preferably chamfered as at 32. In the FIG. 1-3 embodiment, this facilitates sliding the toggle plate into a wall opening. In the FIG. 9 embodiment, this provides an entry tip of reduced cross-section in lieu of the piercing entry tip of the FIG. 1-3 embodiment.

The runners 30, are preferably formed of strips of flexible material, which have been satisfactorily formed of strips of plastic, such as styrene, nylon, polyethylene, or the like, as best seen in FIGS. 1 and 4. The serrations 34 act as a series of ratchet teeth. These teeth may extend across the full face of the runner as shown in FIG. 9 or may be surrounded by a boundary strip 35 as shown in FIG. 1. As illustrated, the runners 30 formed with the serrations 34, are molded with trunions 36 extending from the lower end of the runner, as viewed in the drawings, into the bearing openings 27 in the side walls of toggle plate 15. The head end of the trunions 36 are preferably upset to increase the diameter of the end of the trunion to secure the runner in pivotal engagement with the toggle plate. The upset trunion end in the plastic runner material permits the trunion to be snapped into bearing opening 27 or 27'.

Slideably secured to the runners 30 is a washer 40, as shown in the drawings, preferably of a circular configuration with a plug portion 41 dimensioned to fit into the wall opening in which the anchoring device is to be positioned. It is preferred that the dimensions of this plug portion 41 of the washer 40 be such as to provide a press fit with respect to the wall opening. A flanged capping portion 42 is formed integrally with plug portion 41 and is dimensioned to extend beyond the periphery of plug portion 41 and over the wall opening in which the anchoring device is positioned. A central opening 45 extends through the washer 40, with opening 45 being dimensioned preferably to freely pass the attaching member such as a bolt, screw, nail or push pin, which it is desired to secure by the anchoring device. Runner openings 47, two of which are shown, are provided extending through the plug portion 41 and cap portion 42 of the washer 40. These runner openings 47 are preferably dimensioned to permit passage of the runners through the washer, with frictional engagement between the surfaces of the runner opening and the runner.

As illustrated, the capping portion 42 of washer 40 is preferably formed with slots 48 extending radially from the runner openings 47, though the invention may be practiced without such slots.

As best seen in FIG. 9, the toggle plate may be formed with a plurality of attaching member engaging openings. Thus, an additional opening 23 is shown of a different dimension than opening 22, so that the same anchoring device may be selectively employed to anchor differently dimensioned attaching members. Where additional attaching member engaging openings are provided, the channel side walls are formed with an additional set of bearing openings 27' adjacent the additional attaching member engaging opening 23, and the trunions 36 of the runner are formed with heads which may be snapped into the attaching member engaging opening which is selected for use.

OPERATION

The anchoring device 10, as illustratively shown in the drawings, is fabricated by utilizing conventional production techniques. Thus, the toggle plate 15 is either stamped from the desired sheet material, such as sheet steel or the like, or may be cut from extruded or rolled lengths of channel shaped sheet steel (or rigid plastic, should such be desired) into the illustrated configuration. Chamfered ends 32 are formed by cutting material, or may be stamped during toggle formation. Additionally, the attaching member engaging openings 22 (or 23), which as illustrated are preferably shown as formed with bushing 25 and bearing openings 27 (or 27') are provided either by molding, stamping, or piercing, depending on how the plate 15 is produced. Threading 24, as illustrated in the preferred embodiment, is obtained by conventional tapping dies.

The runners 30, which are illustratively shown as formed of strips of serrated polyethylene, may be formed of a variety of flexible, but preferably self-supporting materials, such as wire or a variety of other strips of relatively flexible sheet materials. In the illustrated embodiment, they are preferably formed with serrations providing ratchet teeth, as best seen in FIGS. 1 and 4, along with projecting trunions 36 to facilitate pivoting of the runners 30 with respect to the toggle plate 15. As illustrated, trunions 36 are inserted into the bearing openings 27 (or 27') in the side walls of the channel forming toggle plate 15, adjacent the attaching member opening 22 or 23 selected for use with the upset trunion ends acting to retain the runners in pivotal engagement with the toggle plate. Two runners as illustrated are preferably provided, one arranged on each side of the attaching member engaging opening 22 (or 23) of the toggle plate. However, as will be understood by those skilled in the art, a single runner may be employed, or more than two runners may be employed, so long as the runners are arranged with respect to the toggle plate to permit pivoting of the toggle plate to a position substantially aligned with the axis of the runners.

The washer 40, as illustratively shown, is preferably fabricated of styrene or polyethylene by injection molding. However, a variety of other production steps may be employed, depending on the materials employed in forming the washer 40. The washer is positioned to slide over the runners, as illustratively shown in FIG. 1. In utilizing the anchoring device, a hole is formed in the wall to which attachment is desired, with the hole of a dimension to permit free passage of the toggle plate through the hole. This hold may be formed by a drill. However, if a drill is not available, or if a drill bit of desired size is not available, the toggle plate may be hammered or otherwise driven through the wall with the sharp entry tip 17 of the toggle (as in the FIG. 1-3 embodiment) facilitating penetration of the wall. Where a small hole has been drilled, because of the unavailability of a drill bit of requisite size, the entry tip 17 may be driven through to form the opening to desired size. Both forms of toggle plate as shown in FIG. 1 or FIG. 9 may be employed as a drill bit with the chamfered ends of the entry tip forming a cutting edge, when the toggle is gripped in the chuck of an electric drill.

The toggle plate is pivoted to a position approaching parallelism to the axis of the runners, as illustrated in FIG. 2, and the entry tip 17, as illustrated, is inserted through the hole in the wall, with the entire toggle plate being pushed to the blind side of the wall, after which it is drawn up against the blind side of the wall to the position illustrated in FIGS. 3 and 4.

By virtue of the greater distance between toggle plate end 19 and attaching member engaging opening 22 (or 23), as compared to the distance between entry tip 17 and the attaching member engaging opening, the plate end 19 will be heavier than end 17 facilitating pivoting of the toggle plate 15 to a position parallel to the wall. Additionally, it will be noted that the chamfers 32 facilitate movement of the ends of the toggle plate over the blind side of the wall.

Washer 40 is slid down over the runners which remain extended through the hole in the wall. It will be observed that the serrations 34 provide ratchet teeth retaining the washer 40 in any position to which the washer is pushed along the runner. The washer is pushed down flush against the wall, with the plug portion 41 of the washer inserted into the wall opening, and the flange portion 42 overlying the wall opening, as illustrated in FIGS. 3-5. Thereafter, as shown in FIGS. 5 and 6, the runners may be bent over the washer into washer slots 48, which accommodate the runners in a plane flush with the washer. Where the washer is formed without slots 48, or even when the washer is provided with slots 48, the runner ends may be broken off flush with the washer. This is readily accomplished by flexing the extending free ends of the runner back and forth, or snipping them.

With the anchoring device in position in the wall, it will be apparent to those skilled in the art that the toggle plate provides a fastening surface which will securely engage either a tapped attaching member such as a bolt, screw, or the like, or may frictionally engage any nail, or friction pin, dimensioned to provide a force fit into the attaching opening 22 of the toggle plate.

Should removal of the attaching member be desired, it may be done without any deleterious effect either on the anchoring device, or on the wall structure, such as often is the case with conventional anchor bolts.

Where the anchoring device is provided for use with differently dimensioned attaching members, e.g., a ¼ or ⅜ inch bolt (see FIG. 9), the toggle is formed with a plurality of attaching member engaging openings such as 22 and 23 dimensioned to accommodate the attaching members, the user may then select the attaching member engaging opening to be used by snapping the upset trunion ends 36 of runners 30 into the bearing openings 27 adjacent the attaching member engaging opening matching the selected attaching member.

It will be understood by those skilled in the art that the term "wall" as used herein is to be understood as describing any relatively thin, relatively planar structure, whether curved or flat including, but not limited, to ceilings, bulkheads, building partitions, decks, and the like.

It is thus seen that a simple anchor device has been provided, serving to provide wall structures formed of relatively frangible materials which do not readily engage and retain attaching devices such as bolts, screws, nails and the like, with a secure anchor with respect to the wall to which applied, with the attaching member subject to selective removal without loss of the anchoring device.

The above disclosure has been given by way of illustration and elucidation and not by way of limitation, and it is desired to protect all embodiments of the herein disclosed inventive concept within the scope of the appended claims.

What is claimed is:

1. An anchoring device providing engaging means for an attaching member, said device comprising:
   an elongate toggle plate dimensioned to fit into an opening in a wall member to which attachment is desired, said toggle plate having a plurality of longitudinally spaced, differently dimensioned attaching member engaging openings therein which are threaded, and a pair of bearing openings for each attaching member engaging openings, one of the openings of each pair of bearing openings lying on each diametrically opposed side of each attaching member opening;
   a pair of elongate runners;
   means for selectively coupling each one of said pair of runners to the bearing openings on the side of any selected attaching member openings; and
   a washer having two spaced slide openings, one for each runner through which said runners pass, said washer having an attaching member opening between said runners.

2. An anchoring device providing engaging means for an attaching member, said device comprising:
   an elongate channel shaped toggle plate having a base portion and side walls, said toggle plate dimensioned to fit into an opening in a wall member to which attachment is desired, said toggle plate having an attaching member engaging opening formed in the base portion, said opening dimensioned to engage an attaching member, and each channel side wall having a bearing opening on diametrically opposed sides of the attaching member engaging opening;
   two elongate runners, one on each side of the attaching member engaging opening;
   a trunnion on each runner extending through the bearing opening in the channel side wall adjacent said runner providing a pivot axis for said toggle plate about a diametral axis of the attaching member opening; and
   a washer having a plug portion dimensioned to fit into the wall opening in which the anchoring device is to be inserted, and a capping portion extending beyond the side of the wall opening, said washer having two spaced slide openings therein, one for each runner, through which said runner passes, said washer having an attaching washer opening between said slide openings whereby the attaching member engaging opening in said toggle plate is positively aligned with the wall member to which attachment is desired.

3. An anchoring device as in claim 2 in which said attaching member engaging opening in said toggle plate is located closer to one end of said plate than to the other end of the plate.

4. An anchoring device as in claim 2, in which said toggle plate comprises an elongate plate member having an entry tip of reduced cross-sectional area as compared to the cross-sectional area of said toggle plate at a point spaced from said entry tip, whereby said toggle plate may be employed as a hole forming bit to form a hole in the wall to which said anchoring device is to be applied.

5. An anchoring device as in claim 2, in which said runners are formed with ratchet teeth frictionally engaging the slide openings in said washer.

6. An anchoring device as in claim 2, in which said runners are formed of a flexible material which may be bent over said washer after the washer is drawn up against the wall in which said anchoring device is inserted.

7. An anchoring device as in claim 6, in which said washer is formed with a slot extending radially from each slide opening in said washer, said slot accommodating said runner when it is bent over said washer.

8. An anchoring device as in claim 1, in which the ends of the side walls of the channel forming said toggle plate are chamfered.

9. An anchoring device as in claim 1, in which said toggle plate has a plurality of differently dimensioned attaching member engaging openings to permit selective accommodation of differently dimensioned attaching members.

10. An anchoring device as in claim 1 in which said toggle plate is elongate and formed with a pointed entry tip at one end thereof, whereby said toggle plate may be driven into a wall to which said anchoring device is to be applied.

* * * * *

UNITED STATES PATENT AND TRADEMARK OFFICE
CERTIFICATE OF CORRECTION

PATENT NO. : 4,043,245
DATED : August 23, 1977
INVENTOR(S) : Stanley Kaplan

It is certified that error appears in the above-identified patent and that said Letters Patent are hereby corrected as shown below:

In claim 2, line 26, which is at column 8, line 17, "attaching washer opening" should read -- attaching member opening --.

Signed and Sealed this

Twentieth Day of December 1977

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 4,043,245      Dated August 23, 1977

Inventor(s) Stanley Kaplan

It is certified that error appears in the above-identified patent and that said Letters Patent are hereby corrected as shown below:

In claim 9, line 1, which is at column 8, line 49,

"claim 1" should read - - - claim 2 - - -;

In claim 10, line 1, which is at column 8, line 54,

"claim 1" should read - - - claim 2 - - -.

Signed and Sealed this

Thirteenth Day of March 1979

[SEAL]

Attest:

RUTH C. MASON
Attesting Officer

DONALD W. BANNER
Commissioner of Patents and Trademarks